(12) United States Patent
Henry

(10) Patent No.: US 7,708,286 B2
(45) Date of Patent: May 4, 2010

(54) STORAGE TANK ORIFICE FLEXIBLE CENTER MOUNT FITTING

(76) Inventor: Drew P. Henry, 265 Burns Dr., Yuba City, CA (US) 95991

( * ) Notice: Subject to any disclaimer, the term of this patent is extended or adjusted under 35 U.S.C. 154(b) by 517 days.

(21) Appl. No.: 11/237,262

(22) Filed: Sep. 27, 2005

(65) Prior Publication Data

US 2006/0082072 A1 Apr. 20, 2006

Related U.S. Application Data

(60) Provisional application No. 60/613,655, filed on Sep. 27, 2004.

(51) Int. Cl.
*F16L 5/02* (2006.01)
*F16L 41/00* (2006.01)

(52) U.S. Cl. .......... 277/607; 277/603; 277/620; 277/623; 277/624; 277/634; 285/139.3; 285/139.1; 285/205

(58) Field of Classification Search .......... 277/603, 277/606, 607, 620, 623, 624, 634; 285/139.3, 285/139.1, 205
See application file for complete search history.

(56) References Cited

U.S. PATENT DOCUMENTS

| | | | | |
|---|---|---|---|---|
| 2,366,442 A | * | 1/1945 | Cunningham | 285/200 |
| 2,441,009 A | * | 5/1948 | Cunningham | 285/200 |
| 3,348,850 A | | 10/1967 | Scales | 277/101 |
| 3,406,988 A | | 10/1968 | Jones | 285/24 |
| 3,759,280 A | | 9/1973 | Swanson | 285/158 |
| 4,346,921 A | | 8/1982 | Gill et al. | 285/110 |
| 4,406,484 A | | 9/1983 | Ramer | 285/176 |
| 4,976,457 A | | 12/1990 | Carter | 285/158 |
| 5,129,684 A | | 7/1992 | Lawrence et al. | 285/161 |
| 5,141,260 A | | 8/1992 | Burwell | 285/133.1 |
| 5,261,761 A | | 11/1993 | Knappert et al. | 404/25 |
| 5,295,760 A | | 3/1994 | Rowe | 405/52 |
| 5,345,813 A | * | 9/1994 | Flessas | 73/46 |
| 5,431,457 A | | 7/1995 | Youngs | 285/158 |
| 5,655,564 A | | 8/1997 | Gavin | 137/363 |
| 5,704,656 A | * | 1/1998 | Rowe | 285/93 |
| 5,722,699 A | | 3/1998 | Brancher | 285/142.1 |
| 5,810,400 A | | 9/1998 | Youngs | 285/139.1 |
| 5,826,919 A | | 10/1998 | Bravo et al. | 285/139.2 |
| 5,961,155 A | | 10/1999 | Youngs | 285/139.1 |
| 5,967,567 A | | 10/1999 | Nordstrom | 285/139.1 |
| 6,079,751 A | | 6/2000 | Youngs | 285/139.1 |

(Continued)

*Primary Examiner*—Alison K Pickard
(74) *Attorney, Agent, or Firm*—Glen L. Gross; Shlesinger, Arkwright & Garvey, LLP

(57) ABSTRACT

A storage tank orifice flexible center mount sealing device comprising a first annular member being substantially flexible having a annular channel, a central orifice and a mating surface, wherein the mating surface is operably configured to be disposed against a wall of a container; and, a second annular member being substantially rigid having a central orifice, wherein the second annular member is disposed in the annular channel and the members are coaxially aligned. The sealing device further comprises a sealing boot disposed on the first annular member, wherein an enclosed environment is defined by the first annular member, the wall and a conduit, which passes through the wall, the central orifices of the first and second members and the sealing boot, wherein mounting hardware used to secure the first and second members to the wall are protected in the enclosed environment and first annular member has a boot mounting area.

7 Claims, 6 Drawing Sheets

U.S. PATENT DOCUMENTS

| | | | |
|---|---|---|---|
| 6,086,117 A * | 7/2000 | Youngs | 285/205 |
| 6,612,620 B1 | 9/2003 | Nordstrom | 285/139.1 |
| 7,325,810 B2 * | 2/2008 | Henry | 277/606 |

* cited by examiner

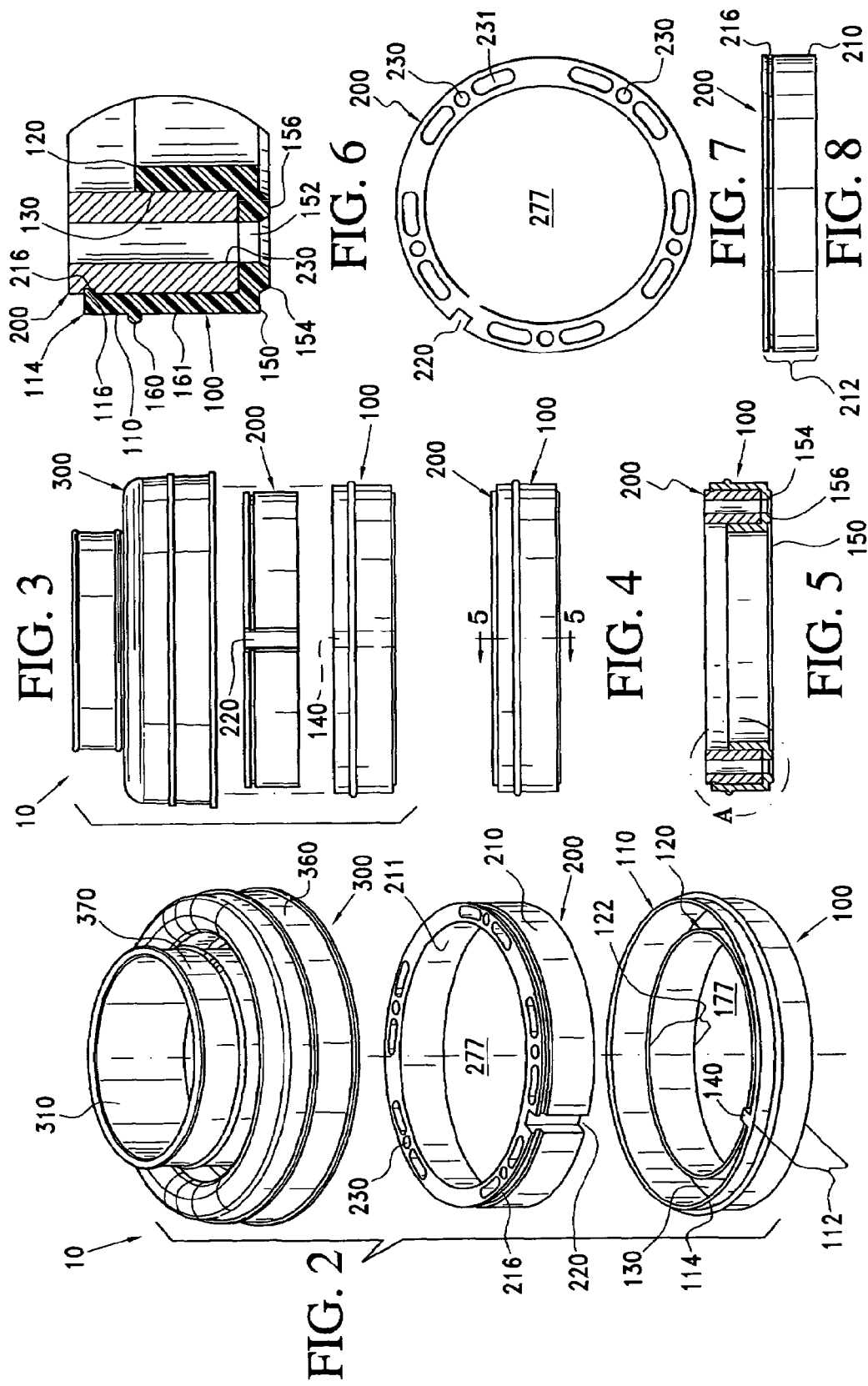

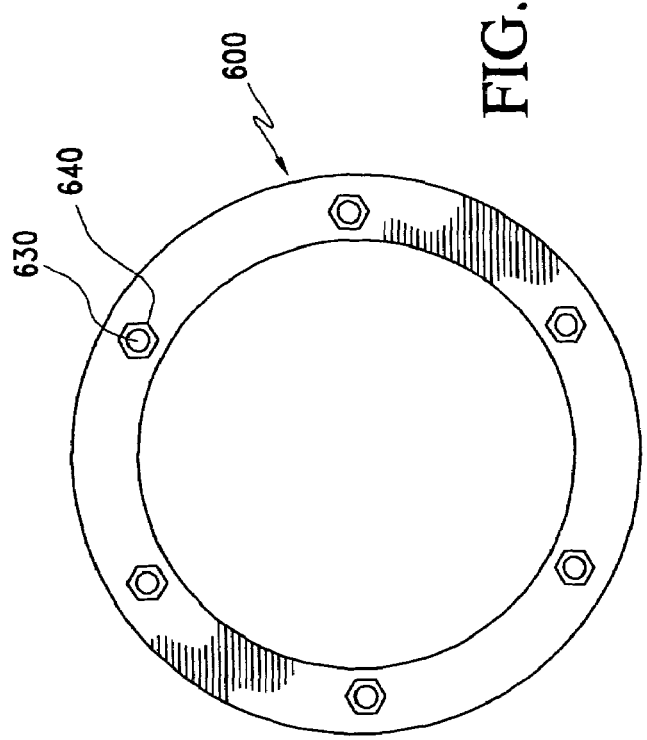
FIG. 15
FIG. 16
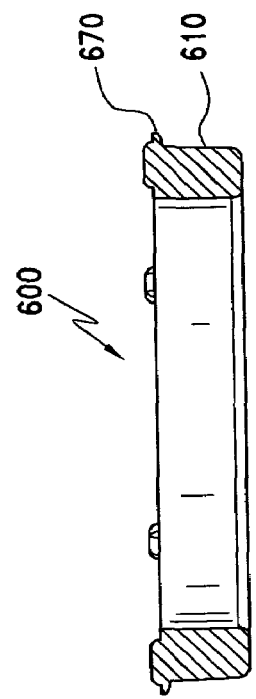
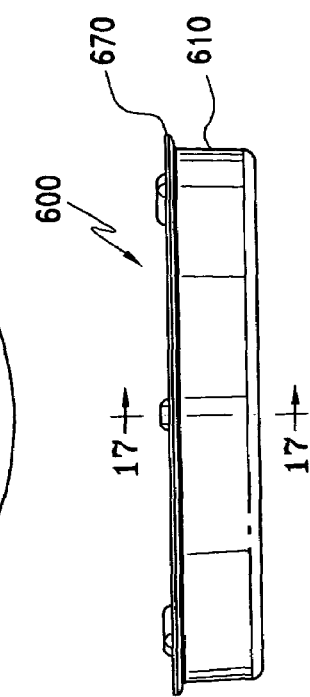
FIG. 17

STORAGE TANK ORIFICE FLEXIBLE CENTER MOUNT FITTING

CROSS REFERENCE TO RELATED APPLICATION

This application is a nonprovisional application of U.S. Application No.: 60/613,655, filed on Sep. 27, 2004, which is incorporated, in its entirety, herein by reference.

BACKGROUND OF THE INVENTION

1. Field of Invention

This present invention relates to sealing devices for conduits that penetrate through walls and the mounting devices therefore.

2. Description of Related Art

The most relevant prior art to which tank orifice seals belong is in the field of underground liquid and gas storage systems. Underground liquid and gas storage systems generally have various conduits or pipes penetrating the walls of such systems. An orifice must be cut in the wall of a storage tank to allow the conduit to penetrate the wall of the tank. This orifice must have a seal to prevent leakage of the tank contents into the exterior environment surrounding the tank. Further, the seal must prevent the environment external to the tank from seeping into the tank and contaminating the tank contents.

Many conventional storage tank fittings attempt to seal a tank orifice, however conventional fittings have several deficiencies. One such deficiency is that conventional tank sealing devices or boots have mounting hardware that is exposed to the corrosive environment both external and internal to the tank. For example, conventional fittings have metal bolts securing the device to the tank. In the underground environment, the dirt has moisture, which will corrode the bolts. The bolts will eventually break from the corrosion then allowing the contents of the tank to leak into the ground. Similarly, if the contents in the tank are corrosive, the mounting hardware inside the tank will erode away and eventually break, allowing either the contents in the tank out or the ground outside the tank in. This condition allows for corrosion of the mounting hardware, which thus accelerates the replacement cycle of the sealing device. This deficiency of corroding mounting hardware requires the early replacement of the conventional fittings, which is a costly and time consuming process.

Some conventional devices attempt to provide a means encapsulate the mounting hardware. However, these conventional devices that attempt to encapsulate mounting hardware are deficient in that they are ineffective and inefficient. Further, these conventional fitting devices are cumbersome, expensive and difficult to maintain.

As will be seen from the description below, it is an object of the present invention to overcome the drawbacks and shortcomings of conventional storage tanks sealing boots.

SUMMARY OF INVENTION

It is on object of the invention to overcome the drawbacks and shortcomings of conventional mounting and sealing devices. The present invention allows for the installation of a flexible fitting with a flexible sealing material and a boot that encapsulates all mounting hardware and structural components. Particularly, the present invention provides an assembly of a substantially rigid structural ring mounted to a flexible ring. The joined assembly is mounted to a wall with fasteners. A boot is removably attached to the outside of the joined assembly.

This present invention provides the capability to protect the mounting hardware thereby preventing corrosion and allowing the sealing boot to remain in use longer for the life of the device. This is accomplished making an assembly by inserting one substantially rigid annular member into a substantially flexible annular member. The assembly is attached to a tank wall with mounting hardware thus preventing leakage between the device and the wall. Additionally, the substantially flexible annular member provides a surface for securing a rubber sealing boot, which prevents leakage from around a pipe or conduit penetrating the tank wall. An additional feature of this device is that the material contained in the tank is protected from any outside environment leaking into the tank.

Additionally, the present invention provides a sealing device for container comprising of a first annular member being substantially flexible having a annular channel, a central orifice and a mating surface, wherein the mating surface is operably configured to be disposed against a wall of a container, and, a second annular member being substantially rigid having a central orifice, wherein the second annular member is disposed in the annular channel and the members are coaxially aligned.

The present invention further provides a device for a sealing assembly, which comprises an annular member having first and second opposing sides, a central orifice and a plurality of mounting orifices, wherein the first side is operably configured to be disposed adjacent to a wall of a container; an annular groove disposed on the second side, wherein the annular groove is operably configured to receive a substantially rigid annular insert member; and, a seal disposed on the first side.

Additionally, the present invention discloses an annular member having a first and second portions, wherein the first portion has a plurality of fastener orifices, an outside radius and an inside radius, wherein the inside radius defining a central orifice and wherein the second portion is perpendicular to the first portion and is attached to the first portion adjacent to the outside radius and the second portion is operably configured to receive and disperse pressure from a sealing boot securing device when in use; and, a gusset disposed between the first and second portions of the annular member.

Still further, the present invention discloses an orifice sealing system comprising a first sealing device having a first and second annular members, wherein the first member being substantially flexible includes a annular channel, a central orifice, a mating surface and a boot mounting area, wherein the mating surface is operably configured to be disposed against a wall of a container; and, the second annular member being substantially rigid having a central orifice, wherein the second annular member is disposed in the annular channel and the first and second members are coaxially aligned; wherein the device further comprises a sealing boot disposed on the boot mounting area of the first member, wherein an enclosed environment is defined by the first member, the wall and a conduit, which passes through the wall, the central orifices of the first and second members and the sealing boot, wherein mounting hardware used to secure the first and second members to the wall are protected in the enclosed environment; and, a second device being identical to the first device disposed on a second opposite side of the wall and coaxially aligned with the first device, wherein the first device and the second device seal the first and second side of the wall with the mating surfaces of the devices and the sealing boots of the first and second device are operably configured to form a seal on the wall and a seal on a conduit, which passes through the first device, the wall and the second device when the system is in use.

These and other features and advantages of this invention are described in, or are apparent from, the following detailed description of various exemplary embodiments of the devices and methods according to this invention.

BRIEF DESCRIPTION OF THE DRAWINGS

Various exemplary embodiment of this invention will be described in detail, with reference to the following figures, wherein;

FIG. 2 is an exploded perspective view of a flexible center mountfitting consisting of three annular members, wherein the first member is preferred to be a substantially flexible sealing ring; the second member is preferably a substantially rigid ring; and, the third member is a flexible boot, according to a preferred embodiment of the present invention;

FIG. 3 is a front exploded view of the flexible center mount fitting of FIG. 2;

FIG. 4 is a front view of the first and second members of the flexible center mount fitting showing the first and second members in an assembled position;

FIG. 5 is a cross-sectional view taken along line 5-5 in FIG. 4 depicting the first member engaged within the second member;

FIG. 6 is a detailed view of how the first and second members assembled, taken in area A in FIG. 5;

FIG. 7 is a top view of the second member;

FIG. 8 is a front view of the second member of FIG. 7;

FIG. 15 is a top view of an alternative embodiment of a second member, namely a substantially rigid ring;

FIG. 16 is a front view of the alternative embodiment of the second member of FIG. 15;

FIG. 17 is a cross-sectional view taken along line 17-17 in FIG. 16;

DETAILED DESCRIPTION OF THE PREFERRED EMBODIMENTS

Figure 1:
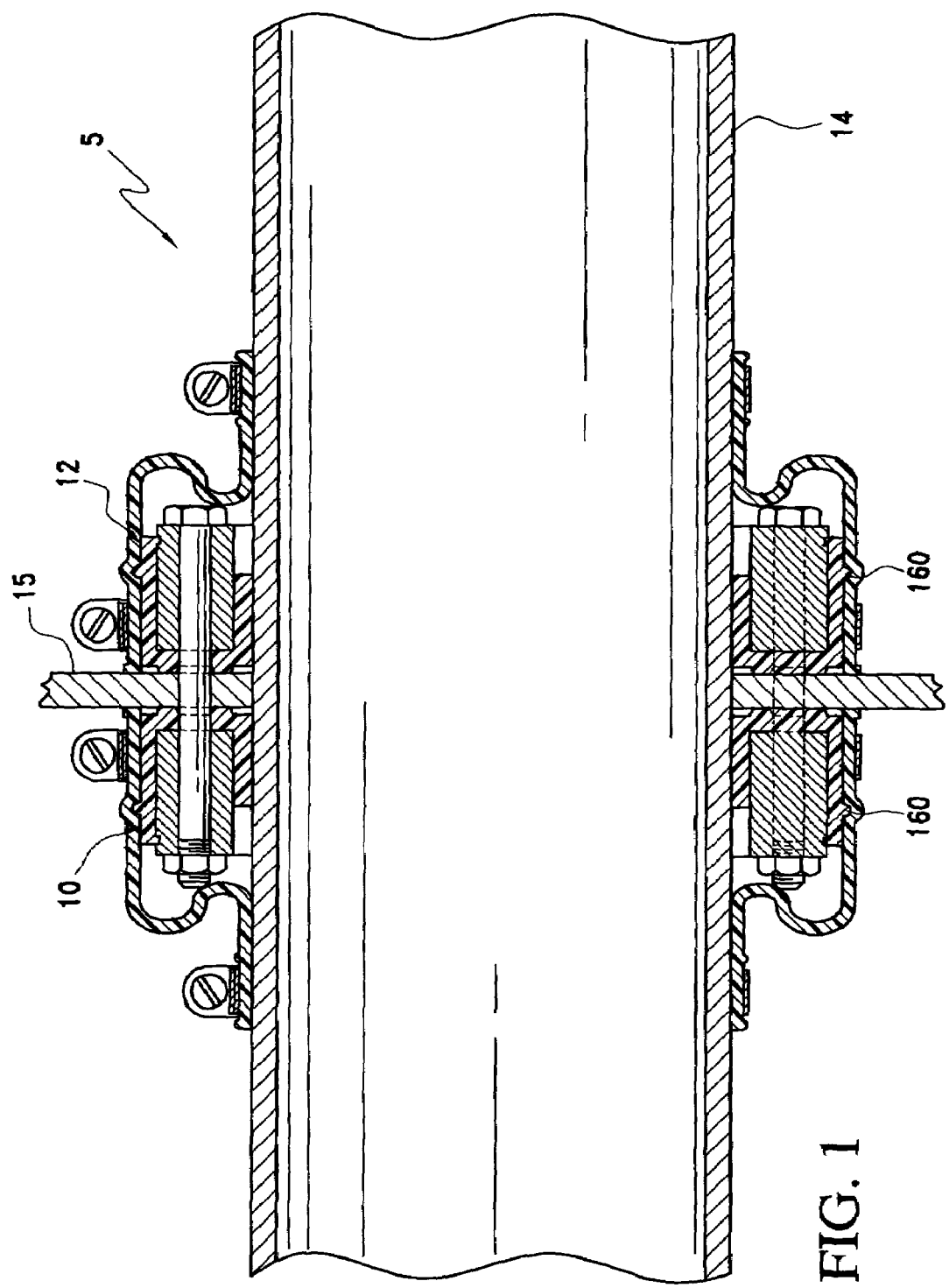
FIG. 1 is a cross-sectional view of two assembled devices made in accordance with this invention in use on a tank wall.

FIGS. 1 and 2 show a flexible center mount fitting device 10, made in accordance with this invention. The device 10, as shown in FIG. 1 and 2, is an orifice sealing device for use on a tank or container wall 15 that has a conduit 14 penetrating the wall 15 of the container of tank. The FIG. 1 shows the device 10, made in accordance with this invention installed on the inside of the tank wall 15 and a second device 12, which is identical to device 10, installed on the outside of the tank wall 15. The two devices 10 and 12 make up the system 5, again as shown in FIG. 1. The device 10 and the system 5, as describe herein, are designed to be used on tanks in the underground environment. However, it should be appreciated that in other various exemplary embodiments, the device 10 and the system 5 may be used on any flat structure through which a conduit 14 penetrates.

The device 10, in addition to providing a sealing device for an orifice in the tank wall 15, provides a flexible mounting mechanism for the conduit or pipe 14 that penetrates the tank wall 15. Further, the device 10 allows the pipe 14 to move during use so as to be non-perpendicular to the tank wall 15. The device 10 seals to the pipe 14 and to the tank wall 15, thus providing a complete seal to the tank.

Still further, the device 10 protects the mounting hardware from the environment in which the device 10 is installed.

The device 10, as shown in FIGS. 2 through 8, includes first member 100, second member 200 and a boot member 300.

Referring to FIGS. 2 through 6, the first member or annular member 100 is preferably constructed out of a substantially flexible material. It is preferred that the annular member 100 be made out of a flexible urethane compound. It should be appreciated that in other various exemplary embodiments the first member can be made out of other flexible materials such as but not limited to a synthetic rubber such as ALCRYN (a trademark owned by Dupont), a pelletized urethane elastomer such as PELLETHANE (a trademark owned by Dow Chemical Company), buna rubber, or other thermoplastic polyurethane elastomers.

The annular member 100 has an outer wall 110, an inner wall 120 and an annular groove 130, as shown in FIG. 2. The outer wall 110 and the inner wall 120 extend between first and second opposing sides. The second side of the annular member 100 includes an annular groove or annular channel 130 is operably configured to receive the second member 200. Annular member 100 further includes a guide tab or an alignment tab 140 disposed on the interior of the outer wall 110. It should be appreciated that in other various exemplary embodiments the first annular member could have a plurality of guide tabs. Still further, it in other various exemplary embodiments the guide tabs could be optional.

Further, the outer wall 110 has a height 112 and the inner wall 120 has a height 122. The inner wall height 122 is operably configured such that the inner wall height 122 is less then the outer wall height 112. Still further, the outer wall 110 includes a top portion 114. The top portion 114 is integral to the first annular member 100 and has a generally rectangular shape. The top portion 114, as shown in FIG. 6, is disposed on the outer wall 110 such that the top portion 114 is generally perpendicular to the outer wall 110 and positioned such that the top portion 114 extends beyond both sides of the outer wall 110. The top portion includes a first end 116 and a second end 118. The first end 116 is disposed such that the first end 116 extends towards the interior of the outer wall 110. The second end 118 is disposed such that the second end 118 extends towards the exterior of the outer wall 110.

Additionally, as shown in FIGS. 5 and 6, the first side of the annular member 100 includes a first surface or mating surface 150. The mating surface 150 in this embodiment is integral to the first side of member 100. The mating surface 150 includes a first gasket seal 154 and a second gasket seal 156. The gasket seals 154 and 156 prevent substances such as but not limited to fluids and gases internal to the storage container wall 15 from escaping past the device 10 as well as preventing substances external to the tank wall 15 from entering pass the device 10. The first and second gasket seals 154 and 156 are constructed out of material common in the art of making gaskets. It should be appreciated that in other various exemplary embodiments, the first and second gasket seals are not integral to the first member. Further, it should be appreciated that in other various exemplary embodiments, the mating surface may have one or more gasket seals.

The first annular member 100 further includes a perimeter ring or rib 160, and a boot mounting area 161 disposed on the outer wall 110, a plurality of mounting orifices 152 and a central orifice 177 as shown in FIGS. 6 and 7. The rib 160 provides additional leak protection such that when the boot 300 is secured to the first annular member 100, the boot 300 deforms to the ribs 160 creating a bend in the boot 300. The area of the outer surface 110 between the first side and the rib 160 is the boot mounting area 161, as shown in FIG. 6.

The second member or annular member 200, as shown in FIGS. 2 through 8, is constructed out of a substantially rigid material. It is preferred that the second annular member 200 be constructed out of a generally rigid polypropylene. It should be appreciated that in other various exemplary embodiments, the second annular member could be made out of other materials such as but not limited to glass filled nylon, steel, a hardened plastic or the like.

The annular member 200 further includes a first surface 210, a second surface 211, a height 212, a plurality of mounting orifices 230 and a guide slot or an alignment slot 220 wherein the guide slot is disposed on the first surface 210. The alignment slot 220 is operably configured to fit with the guide tab 140. The mounting orifices 230 will line up with the mounting orifices 152 of the first member 100 when the guide tab 140 is aligned with the alignment slot 220. It should be appreciated that in other various exemplary embodiments, the second annular member could have a plurality of guide slots that correspond with the number of guide tabs 140 on the first annular member 100. Further, it should be appreciated that in other various exemplary embodiments the guide tab and the alignment tab are optional, thereby allowing for the manual alignment of the mounting orifices 152 and 230.

The first surface 210 of the second annular member 200 further includes a perimeter channel 216 extending around the perimeter of the annular member 200, wherein the channel 216 is operably configured to receive the first end 116 of the top portion 114 of the first annular member 100. It should be appreciated that in other various exemplary embodiments, the top portion and the channel are optional.

The second annular member 200 further includes a central orifice 277 and voids 231. The voids 231 are material conservation voids.

The annular member 100 and 200 are operably configured to engage one another, as shown in FIGS. 5 and 6. In the embodiment, the groove 130 of the first annular member 100 is operably configured to receive the annular member 200. The guide slot 220 of the member 200 is operably configured to receive the guide tab 140 of the member 100. The engagement of the guide tab 140 and the guide slot 220, aids in the alignment of the second member 200 with the first member 100 as well as facilitates the alignment of the first member bolt or mounting orifices 152 with the second member bolt or mounting orifices 230. Additionally, the top portion 114 engages the channel 216 securing the first and second members 100 and 200 together. The inserted second member 200 provides rigidity to the first member 100.

The annular member 200 height 212 is operably configured such that when the first and second members 100 and 200 are assembled, the annular member 200 height 212 is above the outer wall 110 of the first member 100.

The annular member 100 and 200 and the sealing boot 300 have a central conduit orifice as shown in FIG. 1, allowing conduit 14 to pass through perpendicular to the annular member 100 and 200 and the sealing boot 300.

The assembled annular members 100 and 200 are operably configured to be attachable to a surface, such as the wall 15 of an underground tank, as shown in FIG. 1. The plurality of mounting orifices 152 and 230 on annular members 100 and 200 respectively, are operably configured such that when the guide tab 140 and the guide slot 220 are engaged, the mounting orifices 152 and 230 will be coaxially aligned. Further, the mounting orifices 152 and 230 are operably configured to allow hardware or fasteners to pass through the annular members 100 and 200 so as to attach the assembled members 100 and 200 to a surface. It is preferred that the attachment of the assembled members 100 and 200 to a wall 15 be with socket bolts 20 as shown in FIG. 1, through the mounting orifices 152 and 230. It should be appreciated that in other various exemplary embodiments, mounting orifices 152 and 230 could have a hex-shape cavity larger than the socket bolt head as shown in the alternative exemplary embodiment in FIG. 15. It should be appreciated that in other various exemplary embodiments, the cavity could be of any shape as long as the cavity is larger than the socket bolt. The bolts 20 are used to secure the assembled annular members 100 and 200. In this preferred embodiment, nuts and washers are on the opposite side of the tank wall 15 to secure the device 10 in place. However, it should be appreciated that in other various exemplary embodiments, a ring with corresponding orifices could be use on the on the side of the tank wall opposite the device to help secure the device to the tank wall. As the bolts 20 are tightened, the gasket seals 154 and 156 are pressed against the surface of the tank wall 15 forming a seal between the device 10 and the tank wall 15.

FIG. 1 shows the device 10 installed against a tank wall 15 in a cross-sectional view of the assembled system 5, made in accordance with this invention. It should be appreciated that the assembled system 5 comprises the device 10 and a second attachment member 12. In this exemplary embodiment, the second attachment member 12 is identical to device 10. It should be appreciated that in other various exemplary embodiments, the second attachment member could be, but not limited to, a plate operably configured to correspond to the mounting hardware of the device 10.

The third annular member or sealing boot 300 is a common sealing boot in the art of sealing boots. The boot 300 has two openings, a conduit opening 310 and a device opening 320. The boot 300 is constructed out of substantially flexible material such as a peletized urethane elastomer, such as PELLETHANE (a trademark owned by Dow Chemical Company) or other urethane material common in the art of making sealing boots.

Figure 11:
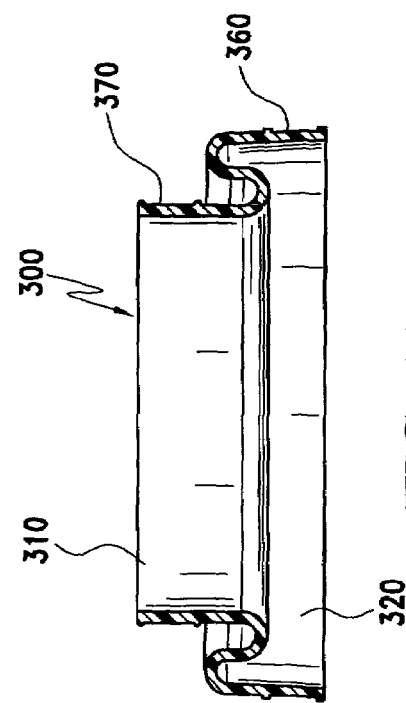
FIG. 11 is a cross-sectional view taken along line 11-11 in FIG. 10.
Figure 9:
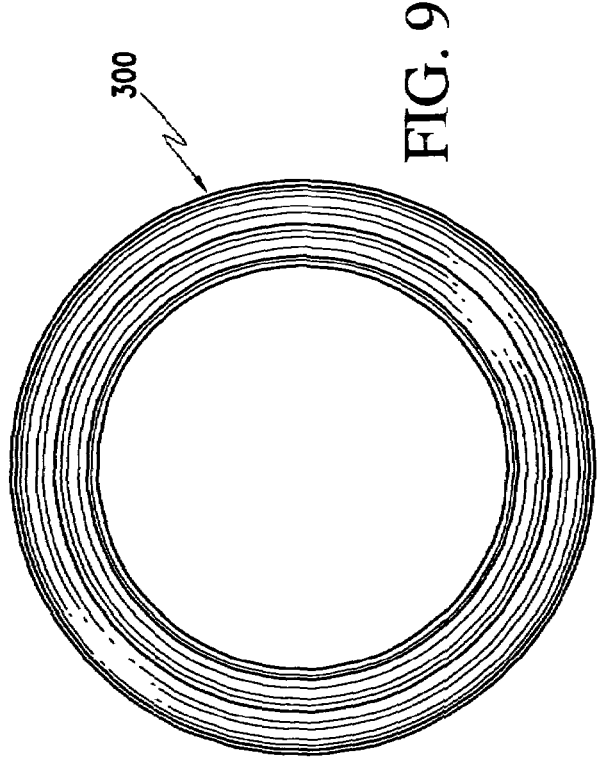
FIG. 9 is a top view of the third member of FIG. 1.
Figure 10:
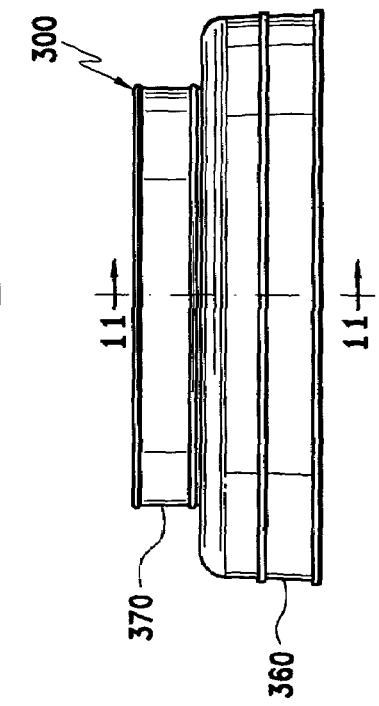
FIG. 10 is a front view of the third member of FIG. 15.

The sealing boot 300, as shown in FIGS. 9 through 11, includes a device clamp mounting surface 360 and a pipe mounting clamp mounting surface 370. The device clamp mounting surface 360 is operably configured to receive a clamping device (not shown) to secure the sealing boot 300 to the first member 100. Additionally, the pipe clamp mounting surface 370 is operably configured to receive a type clamping device (not shown) to secure the sealing boot to the pipe 14 that is being sealed. It is preferred that a hose clamp, which is rubber coated, be used to the third annular member 300 to the first member 100 and the conduit 14. It should be appreciated that in various exemplary embodiments, the third annular member can be secured to the first annular member and the conduit by any known or later developed device for attaching sealing boots, such as but not limited to cable ties.

Once the annular members 100 and 200 are assembled, as shown in FIGS. 4 and 5, the third annular member 300 fits over the assembled annular members 100 and 200 so as to enclose both of the assembled members 100 and 200, thus protecting the assembled members 100 and 200 from their surrounding environment. The boot 300 is attached to the boot mounting area 161 disposed on the outer wall 110 of annular member 100 via any circular banding device as mentioned above. In the preferred embodiment as the clamping device is placed on the device clamp mounting surface 360 and tightened, the first and second annular members 100 and 200 are sealed and protected from their environment. In the preferred embodiment, the hose clamp is rubber coated to protect the hose clamp from the environment.

Referring now to FIGS. 1 through 3 and 9 through 11, the sealing boot 300 provides for the device 10 an enclosed environment such that the device 10 is protected from the environment in which the device 10 is installed. With the sealing boot 300 securely attached as described, the device 10 seals the conduit 14 and the tank wall 15 from any leaks either out of or into the tank. When the system 5 is employed as shown in FIG. 1, a double layer of sealing protection is provided thus meeting current environmental protection law requirements.

The flexible sealing boot 300, in addition to providing a seal to the conduit 14 passing through the device 10, the flexible sealing boot 300 also allows the conduit 14 to be offset from the perpendicular to the device 10. This allowance for offset ensures the device 10 maintains a seal between the device 10 and the tank wall 15; and between the device 10 and the conduit 14 when shifting of the ground occurs.

In the preferred embodiment the mating surface 150 of the first member 100 is flat. It should be appreciated that in other various exemplary embodiments, the first and/or second annular member are shaped so as to properly correspond to a curved wall.

Figure 13:
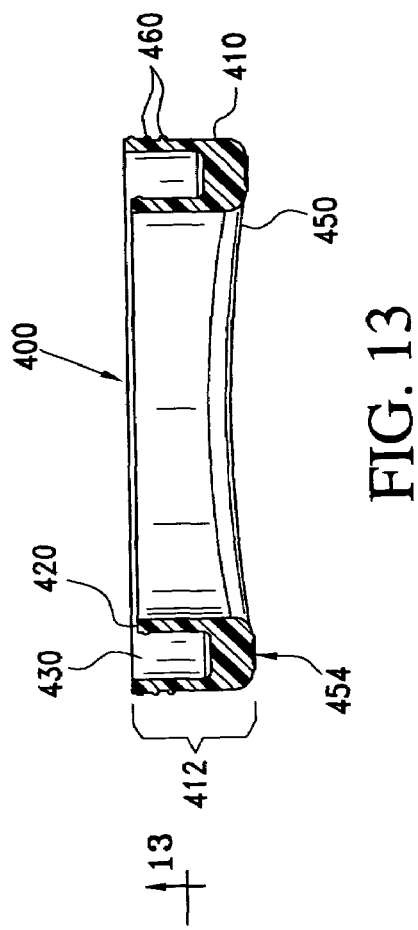
FIG. 13 is a cross-sectional view of the alternative embodiment of the first member taken along line 13-13 in FIG. 12.
Figure 12:
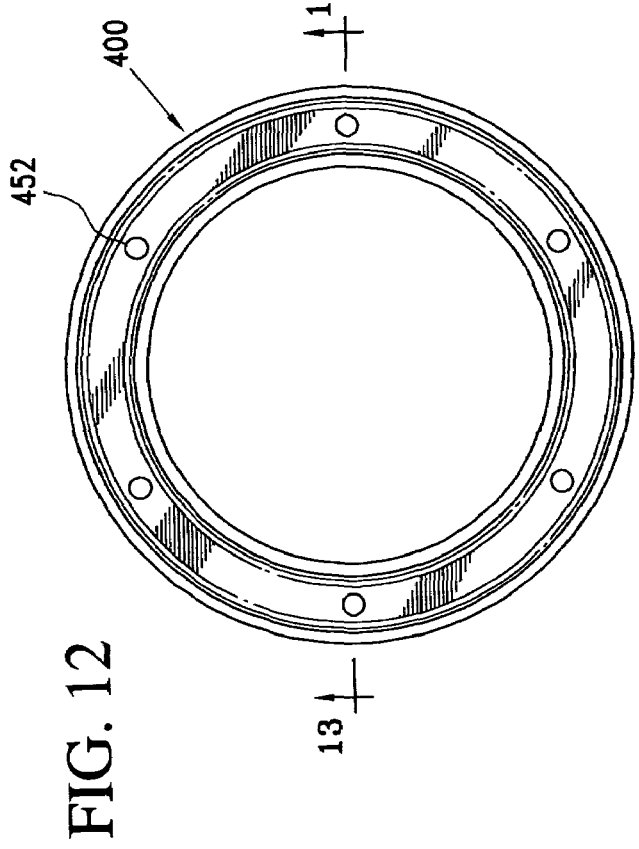
FIG. 12 is a top view of an alternative embodiment of a first member, namely a substantially flexible sealing ring.

FIGS. 12 and 13 show a first member 400, which is an alternative embodiment of the first annular member 100 made in accordance with the present invention. The first member 400 is similar to the first member 100 described above and includes similar features in that the first member 400 includes an outer wall 410 and an inner wall 420 similar to the first member 100 as shown in FIG. 13. The outer wall 410 has a height 412. The inner wall 420 has a height 422. In this exemplary embodiment, the inner wall height 422 is generally shorter than the outer wall height 412.

However, first member 400 has several differences. One of the differences in this embodiment is that the first member 400 does not have a guide tab. Additionally, as shown in FIG. 13, the first annular member 400 has a concave first surface or mating surface 450 to match surfaces that are convex. Further, first member 400 has a gasket seal 454 operably configured with one seal vice two as discussed above for the first annular member 100. An additional difference between the first member 100 and the first member 400 is that the first member 400 does not include a top portion. Further, the mating surface 450 has edges that are rounded.

An additional difference in first member 400, is that the first member 400 does not have the perimeter channel or recessed area 160. The first member 400 does include a plurality of annular rings or ribs 460 disposed on the outer wall 410, as shown in FIG. 13. The ribs 460 increase leak protection such that when the boot 300 is tightened to the first member 400, the boot 300 is deformed creating a bend at the ribs 460.

Figure 14:
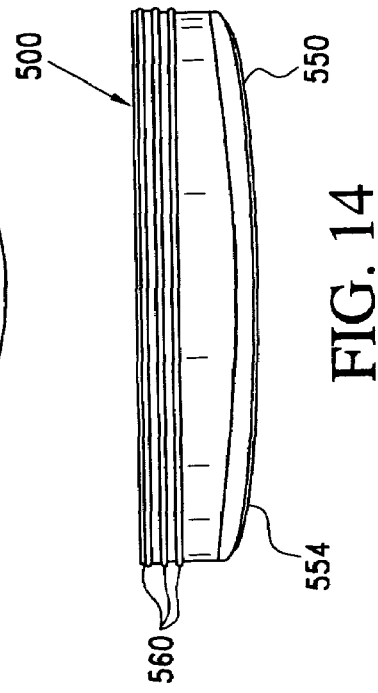
FIG. 14 is a front view of another alternative embodiment of the first member of FIG. 12.

Further, FIG. 14, shows a first annular member 500, which is an additional alternative embodiment of the first member 100 made in accordance with this invention. The first member 500 is similar to the first annular member 100 and the first member 400 described above in that the first member 500 includes an outer wall 510 and a plurality of annular rings or ribs 56 disposed on the outer wall 510. However, first member 500 is different in that member 500 has a convex first surface or mating surface 550 to match surfaces that are concave.

FIGS. 15 through 17 shows a second member 600, which is an alternative embodiment of the second member 200 made in accordance with the present invention. The second member 600 is similar to the second member 200 described above and includes similar features in that second member 600 includes a first surface 610 and mounting orifices 630.

However, the second member 600 has several differences. One of the differences in this embodiment is that the second member 600 does not have a guide slot. FIG. 15 further show mounting orifices 630 with a hex shape cavity 640 to hold hex bolts in place without the need of a wrench. Still, another difference is that member 600 does not have a perimeter channel as is included in the second member 200.

As shown in FIGS. 16 and 17, second member 600 includes a perimeter rib 670. The perimeter rib 670 is disposed perpendicular to the first surface 610 as shown in FIG. 17. The perimeter rib 670 provides a seal with the first member 100 as the bolts 20 on device 10 are tightened.

Figures 18, 19, 20:
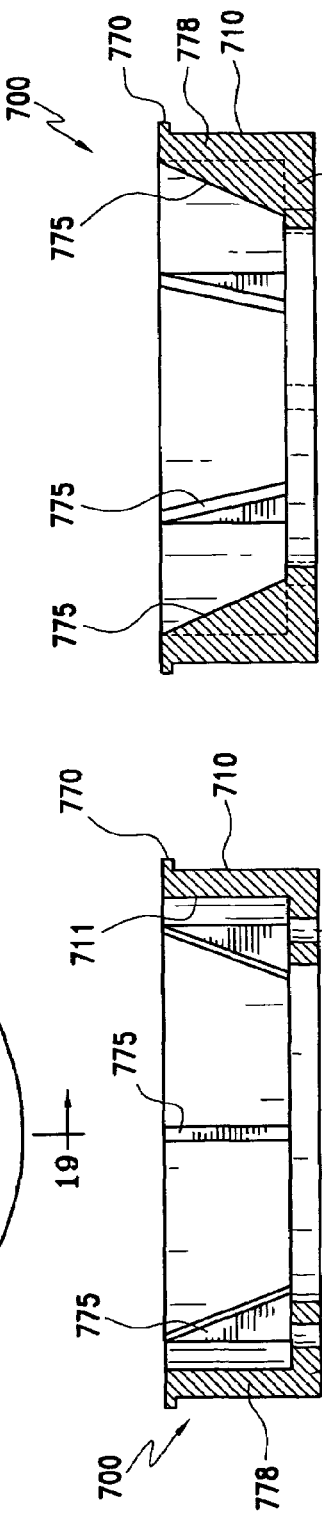
FIG. 18 is a top view of an additional alternative embodiment of a second member, namely a substantially rigid ring.
FIG. 19 is a cross-section view taken along 19-19 of the alternative embodiment of the second member of FIG. 18; and, FIG. 20 is a cross-sectional view taken along line 20-20 in FIG. 18.

FIGS. 18 through 20 shows a second member 700, which is an alternative embodiment of the second member 200 made in accordance with the present invention. The second member 700 is similar to the second member 200 described above and includes similar features in that second member 700 includes a first surface 710 and a second surface 711.

However, the second member 700 has several differences. One of the differences in this embodiment is that the second member 700 does not have an alignment slot and is operably configured to engage the first member 100 without a guide tab. Additionally, second member 700 does not have the perimeter channel similar to perimeter channel 216.

As shown in FIGS. 19 and 20, second member 700 includes a perimeter rib 770 and a plurality of gussets 775. The perimeter rib 770 is disposed perpendicular to the first surface 710 as shown in FIG. 20. The perimeter rib 770 provides a seal with the first member 100 as the bolts 20 on device 10 are tightened. The gussets 775 strengthening members to provide support to the second surface 711.

Further, FIGS. 19 and 20 are a cross-sections of the second member 700 and show that the second member 700 has a first portion 776, wherein the first portion 776 has a plurality of fastener orifices 730, an outside radius and an inside radius, wherein the inside radius defines a central orifice 777, and a second portion 778, wherein the second portion 778 is perpendicular to the first portion 776 and disposed on the first portion 776 adjacent to the outside radius. The first portion 776 and the second portion 778 are integral to each other. It should be appreciated that in other various exemplary embodiments, the first and second portion could be individual parts fastened together.

Additionally, it should be appreciated that in other various exemplary embodiments, the device 10 could have application for any storage container with walls and regardless if the storage container is underground, above ground, or under water.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

What is claimed is:

1. A sealing device for sealing an orifice in a wall comprising:
   a first annular member being substantially flexible having an outer wall, an inner wall and a mating surface disposed between the outer and inner wall, wherein the inner wall has a height less than a height of the outer wall, an annular channel being defined between the outer and inner wall and, a central orifice, wherein the mating surface is operably configured to be disposed against the wall;
   a second annular member being substantially rigid having a central orifice, wherein the second annular member is disposed in the annular channel and the members are coaxially aligned; and,
   a sealing boot disposed on the first annular member, wherein an enclosed environment is defined by the first annular member, the sealing boot and a conduit, which passes through the wall, the central orifices of the first and second members and the sealing boot, wherein the second member and mounting hardware used to secure the first and second members to the wall are protected in the enclosed environment, and wherein the first annular member has a boot mounting area disposed on the outer wall, wherein the boot mounting area is operably configured to receive the sealing boot.

2. A sealing device, as recited in claim 1,
   wherein the first annular member has an alignment tab disposed along the height of the outer wall in the annular channel and the second annular member has an alignment slot, wherein the alignment slot engages the alignment tab when the second annular member is disposed in the annular channel.

3. A sealing device as recited in claim 1, further comprising:
   a seal disposed on the mating surface.

4. An orifice sealing system comprising:
   a first sealing device having a first and second annular members, wherein the first member being substantially flexible includes an annular channel, a central orifice, a mating surface and a boot mounting area, wherein the mating surface is operably configured to be disposed against a wall of a container; and, the second annular member being substantially rigid having a central orifice, wherein the second annular member is disposed in the annular channel and the first and second members are coaxially aligned; wherein the device further comprises a sealing boot disposed on the boot mounting area of the first member, wherein an enclosed environment is defined by the first member, the sealing boot and a conduit, which passes through the wall, the central orifices of the first and second members and the sealing boot, wherein the second member and mounting hardware used to secure the first and second members to the wall are protected in the enclosed environment; and,
   a second device being identical to the first device disposed on a second opposite side of the wall and coaxially aligned with the first device, wherein the first device and the second device seal the first and second side of the wall with the mating surfaces of the devices and the sealing boots of the first and second device are operably configured to form a seal on the wall and a seal on a conduit, which passes through the first device, the wall and the second device when the system is in use.

5. An orifice sealing system as recited in claim 4, wherein the gasket seal is integral to the mating surface.

6. An orifice sealing system as recited in claim 4, wherein the first annular member has a guide tab and the second annular member has a guide slot such that when the second annular member is coaxially aligned with the first annular member the guide slot engages the guide tab.

7. An orifice sealing system as recited in claim 4, wherein the first annular member is made of a substantially flexible material and the second annular member is made of a substantially rigid material.

* * * * *